May 20, 1952 G. R. ERICSON 2,597,235
FILTER

Filed June 16, 1947 2 SHEETS—SHEET 1

INVENTOR

*George R. Ericson*

May 20, 1952     G. R. ERICSON     2,597,235
FILTER

Filed June 16, 1947     2 SHEETS—SHEET 2

INVENTOR

*George R. Ericson*

Patented May 20, 1952

2,597,235

UNITED STATES PATENT OFFICE 2,597,235

FILTER

George R. Ericson, Kirkwood, Mo., assignor to Carter Carburetor Corporation, St. Louis, Mo., a corporation of Delaware Application June 16, 1947, Serial No. 754,881

1 Claim. (Cl. 210—181)

This invention relates to filtering means, as oil filters suitable for use in connection with automative internal combustion engines, and has particular reference to a filter leaf element of improved form and construction, for use in such filters. It may be noted here that the present invention is directed to certain novel improvements in filter elements of the wafer or disc type disclosed in Patent No. 1,944,550 to George R. Ericson, issued January 23, 1934.

An object of the present invention is to provide a composite filter embodying independently functioning, wafer or disc-type hollow filtering leaf elements of greatly improved construction, which is capable of filtering out substantially all impurities including the finest solids and carbon particles, from engine lubricating oil directed through the filter.

Another object is to provide, for a filter of the character indicated, a filtering element of greatly improved form and construction, affording a marked structural stability of the element in filter assembly, and providing an element capable of maintaining its filtering capacity and effectiveness over a long period of use.

Another object is to provide a multiple-element filter characterized by a capacity and rate of oil filtering fully sufficient for keeping the oil in a visibly clean and clear condition, and yet by such compactness and small overall size as to facilitate location of the filter under the engine hood of an automotive vehicle.

A further object of the invention is to provide a filter of the character hereinabove indicated, which is of simple and inexpensive construction.

Other objects and advantages of the present invention will appear readily from the following description of a presently preferred embodiment thereof, illustrated in the accompanying drawings, wherein Fig. 1 is a view in sectional elevation, of a filter embodying the present improvements.

Figure 1:
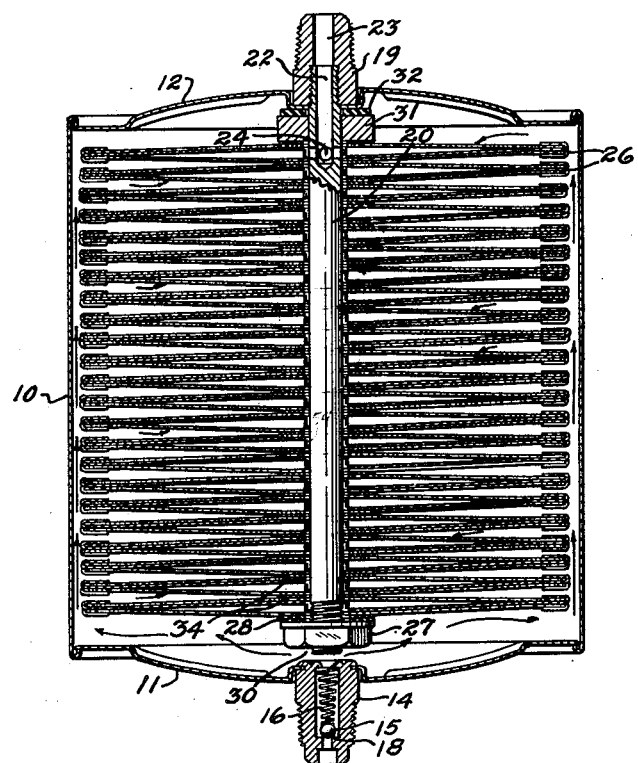

Referring first to Fig. 1, the filter of the present invention includes a casing 10 of relatively thin sheet metal or other suitable material, having opposite casing heads 11 and 12 each in fluidtight assembly to the casing. The head 11 supports an oil inlet fitting 14 which provides in the inlet passage thereof, a ball check valve 15 normally urged by a spring 16, to passage-closing position against a valve seat 18. The spring 16 preferably is of relatively light capacity, permitting valve-opening displacement of the ball valve by low oil pressure, to admit oil to the interior of the filter casing. Inlet fitting 14 is externally threaded for connection to an oil delivery conduit (not shown) which may lead from the usual engine oil pump (not shown).

Figure 6:
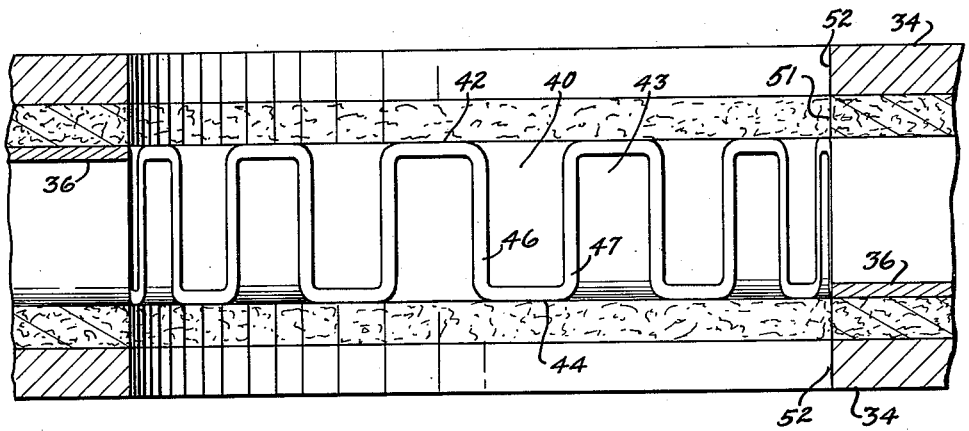
Fig. 6 is a greatly enlarged, fragmentary section of the filter element in the central oil discharge region thereof.
Figure 4:
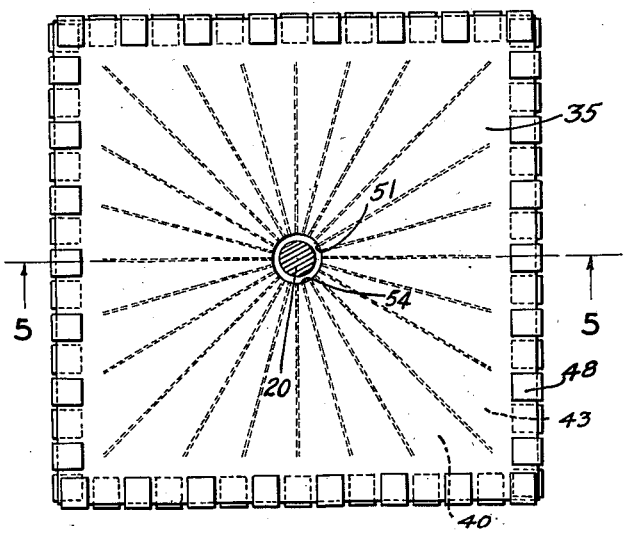
Fig. 4 is a plan view of an assembly filtering element on its supporting stem.

The opposite casing head 12 carries an outlet fitting 19 adapted to be connected to suitable conduit means (not shown) for conveying filtered oil to points of engine lubrication. Extending centrally in the casing 10 from the outlet fitting 19, is a rod or stem 20 which is secured to the fitting as by screw-threading in the manner shown. The stem is provided with an axial bore 22 open to the discharge passage 23 of the fitting, and cross bores 24 for the passage of filtered oil to the bore 22. Stem 20 supports a plurality of wafer or disc-form filter elements 26 stacked thereon and held in place between nut 27 and sealing gasket 28 at the free end 30 of the stem, and a collar 31 abutting outlet fitting 19 through a sealing gasket 32. Separating the filtering elements one from another in the region of the stem, are spacer members 34 (Figs. 1 and 6) which may be ordinary washers. The spacing washers in the present example, are of a thickness to afford filtering element spacing sufficient to allow full access of oil to the surfaces of each filter element, and yet such as will permit the stacking of a comparatively large number of filter elements on a stem of given length.

Since the filtering leaf elements are preferably identical in form and construction according to the present invention, a description of one thereof will suffice for all. Referring to Figs. 2 to 6, each filter element comprises a pair of sheets of filter paper 35 separated by a plate-like spacer member 36 (Figs. 5 and 6) adapted for securing the filter papers thereto in a relatively simple and effective manner presently to be described. Member 36 is constructed from suitable sheet material such as thin gauge sheet metal, and may be formed by a single cutting and stamping operation, to afford preferably a square member having its margins provided with a series of projections or ears 38 (Fig. 2), its central zone apertured as by a circular opening 39, and the major portion or extent of its surface deformed to provide relatively shallow flutes or channels 40 in one face 42 and complementary channels 43 in the opposite face 44 of the member. As appears in Fig. 2, the channels 40 are directed radially of the central opening 39, and in plan view, the sides thereof converge in the direction of the opening 39. Moreover, each channel 40 beginning in the plane of the member near a margin thereof, increases in depth uniformly to the inner end 46 thereof opening to the central aperture 39 (Figs. 5 and 6), and such that in the depthwise dimension, the channel diverges equally above and below the plane of the member to the opening 39, as this appears clearly in Fig. 5. In consequence of such formation of the channels 40 opening to the face 42 of the member, the channels 43 which open to the opposite face 44 of the member and wherein each has its end 47 communicating with aperture 39, are of identical character but located such that each is between an adjacent pair of the channels 40. Thus the channels 40 and 43 appear in alternate arrangement on the opposite sides or faces of the member, and all open to the central aperture 39.

Figure 2:
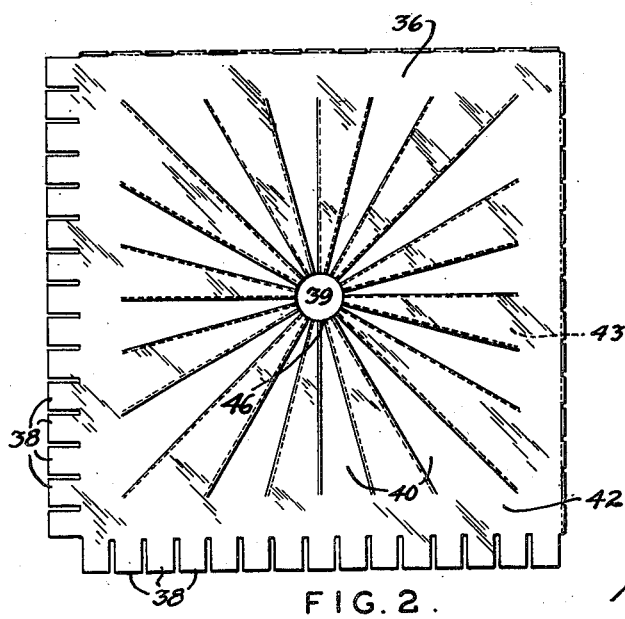
Fig. 2 is a view in plan, of a plate-like support and spacing member for a filtering element as now provided.
Figure 3:
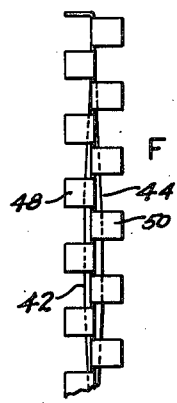
Fig. 3 is a fragmentary, edge view of the spacing member, illustrating filter paper securing elements thereof alternately out-turned with respect to the sides of the member, prior to displacement of these elements into filter paper securing positions.
Figure 5:
Fig. 5 is an enlarged section through a filtering leaf element, as taken along the line 5—5 in Fig. 4.

Before application of the filter papers 35 to the member 36, the latter preferably has its marginal projections or ears 38 out-turned in alternately opposite manner as indicated in Figs. 2 and 3, such that the ears 48 projecting outwardly of the face 42 and the ears 50 projecting outwardly of the opposite face 44 of the member, are substantially normal to the plane of the member to facilitate initial location of the filter papers over the surfaces or faces 42 and 44. The initial out-turning of the ears may be effected in the cutting and stamping operation, as will be appreciated.

The filter papers 35 are provided of suitable material hereinafter to be indicated, and each is formed to afford a square-shape sheet of a size to cover a face of the member 26, with its margins closely adjacent or substantially in edge-abutment with the out-turned ears 38. Each paper further is centrally apertured as at 51 (Figs. 4, 5, and 6), such that the circular margin thereof in application of the paper, will register substantially with the margin of the aperture 39 in member 36. Upon placement of a filter paper on the face 42 of member 36 (Fig. 4), the ears 48 out-turned relative to face 42, are then displaced or bent back upon the marginal portions of the filter paper (Figs. 4 and 5), thereby serving to hold or clamp the paper securely in place upon the surface 42 of the member. A like filter paper is applied in the same manner to the opposite face 44 of the member, with the ears 50 on that side, bent into clamping relation to the marginal portions of the paper.

In filter assembly of a plurality of such elements, the elements together with the spacing washers 34, are stacked on stem 20, the latter extending through the central openings of the elements and the openings 52 (Fig. 6) of the washers 34, as this arrangement appears in Fig. 1. Moreover, the filter elements and spacing washers are relatively disposed to effect registering alignment of the openings thereof; and since the latter are of greater diameter than stem 20, the openings in registry form an annular passage 54 longitudinally of stem 20, which passage is closed at one end by the sealing gasket 28, and at its other end communicates with the stem cross bores 24. The open ends 46 and 47 of the channels in each of the filter elements, thus open directly to passage 54 (see Fig. 4). It may be noted here that the washers 34 in filter assembly, serve to retain the central portions of the filter papers engaged thereby, against the members 36.

From the foregoing, it now will appear that the presently improved filter element requires but three parts: the channeled member 36 and a pair of filter papers 35. In channeling the comparatively thin gauge sheet metal member 36 as described, the member is thereby very materially strengthened against bending under the lateral stressing of the completed element in filter use, imposed by the pressure of the oil delivered to the filter casing and the accumulation of filtered solids on the filtering surfaces. Accordingly, member 36 provides a firm support for the filter papers 35, effectively maintaining them in filtering position in the filter assembly. Moreover, and importantly to the simplicity and low manufacturing cost of the filter element, is the present manner of filter paper attachment to the member 36, wherein lugs or ears 38 provided as integral parts of the support member, are merely bent or turned-over into clamping engagement with the margins of the filter papers.

In regard to the filter papers 35, these are formed from fibrous sheet material constructed and treated in a manner to characterize the same by appreciable tensile strength, resiliency and pliability of its fibres; a comparatively fine porosity, and a water or moisture impervious fibre structure. Reference may be had to Patent No. 1,944,550 above noted, for an example of such material. However, it may be stated here for convenience, that the material of the papers 35 may be lacquered filter paper produced by soaking ordinary filter paper in a solution of cellulose brushing lacquer and thinner, provided by mixing a suitable volume of lacquer, thin enough to be of proper consistency for ordinary brush application, with approximately nine times its volume of lacquer thinner. The thinned lacquer thus provided is found in practice to be entirely effective for the purpose which is to block the normal hygroscopic action of the paper but still to leave the paper pores unobstructed upon drying and without any coating which would be visible to the naked eye. By so treating the paper, it is rendered substantially immune to the effect of moisture which may be contained in the oil being filtered. Furthermore, the lacquer serves to cement the fibres together in a manner to increase the tensile strength and the resilience and toughness of the material.

In filter operation, oil under pressure is admitted past check valve 15 into the filter casing 10 and about the filter elements 26 therein. The oil filters through the papers 35 and thence the filtered oil flows in the channels 40 and 43 of members 36, to and through central passage 54, the cross bores 24 and axial bore 22 in stem 20, and through passage 23 of outlet fitting 19 to the conduit (not shown) leading the clean oil to points of engine lubrication. As oil filtering takes place in engine operation, the filter papers subjected on the exposed surfaces thereof, to the oil feed pressure obtaining in the casing, may undergo some degree of lateral depression in the regions thereof overlying the channels 40 and 43, this being permitted by the flexibility and resiliency afforded by the lacquer treatment of the papers. When the engine is stopped, check valve 15 closes to prevent oil backflow from the filter, while the portions of the filter papers flexed inwardly of the channels gradually reassume their original positions. Consequently, in relatively frequent starting and stopping of the engine, the resultant flexure of the filter papers over the channels 40 and 43, tends to effect a slight degree of clean oil pumping from the filter in each instance of engine starting, such serving to assure a desirably rapid initial delivery of oil to the points of engine lubrication.

It will be appreciated here that lateral flexure of the filter papers when occurring, will result in some degree of interior kneading of the fibrous paper structure and coincidentally therewith, a kneading and break-up of the slime beds forming on the filter paper surfaces. Such serve to prolong the original fine porosity of the filter papers and the filtering effectiveness thereof, whereby the useful life of the filter may be considerably lengthened. Should it be desired to increase the frequency of filter paper flexure, as may be advantageous in engine installations where the periods of operation are comparatively long, the inlet check valve 15 may be omitted, with the result that as the speed of the engine is varied, the consequent variations in oil pressure will produce flexing of the filter papers. In case the filter papers should become blocked by too long use and deposit of excess foreign material, the excessive pressure in the casing will cause the portions of the paper overlying the inner ends of channels to flex inwardly and thereby act as safety valves to release oil to the delivery lines.

The presently improved filter elements have a further advantage in use, in that in respect to each element, oil filtering through the filter paper on one side of the support 36, is received only in channels individual to that filter paper, while oil filtering through the paper on the opposite side of the member 36, likewise is received only in channels individual to the latter paper. Consequently, the filtering passage of oil through the pores of one filter paper occurs without any interfering or restrictive influence thereupon by the filtered oil from the other filter paper, such as would tend to result were the filtered oil receiving channels of member 36 common to both filter papers.

While the filter elements as herein shown and described, are of generally square form in plan, these elements may be circular or of any other shape in plan, as may be desired. Moreover, it will be understood that the invention is susceptible of many modifications without departing from the spirit and full intended scope thereof, as defined in the accompanying claim.

I claim:

A filter assembly for use in a casing having an inlet and an outlet and positionable therein between the inlet and outlet in separating relation thereto, said assembly comprising filter elements each including a spacer plate having a central aperture, radial flutings on opposite faces thereof opening into said aperture but closed near the outer margin of the plate, and sheets of filtering material abutting opposite faces of said plate, the central apertures of the spacer plates in the assembly being in axial alignment and forming a passage for communication with the casing outlet, and the portions of said sheets overlying said flutings of each plate being unsupported so that said sheets may flex inwardly to effect direct openings to said passage in case of excess oil pressure in the casing.

GEORGE R. ERICSON.

REFERENCES CITED

The following references are of record in the file of this patent:

UNITED STATES PATENTS

| Number | Name | Date |
|---|---|---|
| 203,037 | Hebard | Apr. 30, 1878 |
| 424,303 | Jensen | Mar. 25, 1890 |
| 1,750,185 | McGeehan et al. | Mar. 11, 1930 |
| 1,944,550 | Ericson | Jan. 23, 1934 |
| 2,088,199 | Gleason | July 27, 1937 |
| 2,444,147 | Walton | June 29, 1948 |

FOREIGN PATENTS

| Number | Country | Date |
|---|---|---|
| 324,696 | France | Apr. 8, 1903 |
| 345,047 | France | Nov. 19, 1904 |